United States Patent
Cheng et al.

(10) Patent No.: US 10,209,702 B2
(45) Date of Patent: Feb. 19, 2019

(54) TOOL MANAGEMENT SYSTEM AND METHOD THEREOF

(71) Applicant: INDUSTRIAL TECHNOLOGY RESEARCH INSTITUTE, Hsinchu (TW)

(72) Inventors: Chih-Ping Cheng, Miaoli County (TW); Chao-Chuang Mai, Taichung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 212 days.

(21) Appl. No.: 15/383,949

(22) Filed: Dec. 19, 2016

(65) Prior Publication Data
US 2018/0052442 A1    Feb. 22, 2018

(30) Foreign Application Priority Data

Aug. 19, 2016 (TW) .............................. 105126657 A

(51) Int. Cl.
*G05B 19/4065* (2006.01)
(52) U.S. Cl.
CPC ............. *G05B 19/4065* (2013.01); *G05B 2219/32422* (2013.01); *G05B 2219/33079* (2013.01);
(Continued)
(58) Field of Classification Search
CPC ...... G05B 19/4065; G05B 2219/32422; G05B 2219/33079; G05B 2219/36291;
(Continued)

(56) References Cited

U.S. PATENT DOCUMENTS

| | | | |
|---|---|---|---|
| 4,442,494 A | | 4/1984 | Fromson et al. |
| 4,694,686 A | * | 9/1987 | Fildes ................ G05B 19/4065 324/71.1 |

(Continued)

FOREIGN PATENT DOCUMENTS

| | | |
|---|---|---|
| CN | 101770222 A | 7/2010 |
| CN | 102870112 A | 1/2013 |

(Continued)

OTHER PUBLICATIONS

Shan Wan, et al. "Web-based process planning for machine tool maintenance and services." Procedia CIRP 38(2015): 165-170.

(Continued)

*Primary Examiner* — Kenneth M Lo
*Assistant Examiner* — Michael J Huntley
(74) *Attorney, Agent, or Firm* — Maschoff Brennan

(57) ABSTRACT

A tool management system of machine tools includes a reader, a receiver, a storage unit, a processor and a control unit. The reader is configured for reading at least one category parameter of the tool according to a tool index code of the tool. The receiver is configured for receiving real-time process information of the tool with a preset periodicity. The storage unit is configured for storing the tool index code, the category parameter, and the real-time process information. The processor is configured for processing a weighting algorithm to obtain a result according to the category parameter and the real-time process information. The control unit is configured for sending a control instruction according to the result.

16 Claims, 2 Drawing Sheets

(52) U.S. Cl.
CPC .............. *G05B 2219/36291* (2013.01); *G05B 2219/36347* (2013.01); *G05B 2219/37209* (2013.01); *G05B 2219/37252* (2013.01); *Y02P 90/205* (2015.11)

(58) Field of Classification Search
CPC ........... G05B 2219/36347; G05B 2219/37209; G05B 2219/37252
See application file for complete search history.

(56) References Cited

U.S. PATENT DOCUMENTS

| | | | | |
|---|---|---|---|---|
| 4,831,365 | A | * | 5/1989 | Thomas ............. G05B 19/4065 340/680 |
| 5,189,624 | A | | 2/1993 | Barlow et al. |
| 5,244,447 | A | | 9/1993 | Tanaka et al. |
| 5,602,347 | A | | 2/1997 | Matsubara et al. |
| 5,798,928 | A | | 8/1998 | Niwa |
| 6,584,415 | B1 | | 6/2003 | Uneme et al. |
| 6,615,103 | B2 | | 9/2003 | Fujishima et al. |
| 6,665,580 | B1 | | 12/2003 | Susnjara |
| 7,310,567 | B2 | | 12/2007 | Zetek et al. |
| 7,684,891 | B2 | | 3/2010 | Okrongli et al. |
| 7,719,218 | B2 | * | 5/2010 | Iwashita ................ B23Q 17/09 318/432 |
| 8,294,403 | B2 | * | 10/2012 | Haas .................... G05B 19/406 318/473 |
| 8,316,742 | B2 | | 11/2012 | Craig et al. |
| 9,165,316 | B2 | | 10/2015 | Tiano |
| 9,460,170 | B2 | | 10/2016 | Boensch et al. |
| 2002/0013639 | A1 | * | 1/2002 | Fujishima .............. B23Q 41/08 700/175 |
| 2003/0014322 | A1 | | 1/2003 | Kreidler et al. |
| 2003/0179226 | A1 | | 9/2003 | Kawai et al. |
| 2005/0021169 | A1 | | 1/2005 | Sagawa et al. |
| 2008/0116833 | A1 | * | 5/2008 | Iwashita ................ B23Q 17/09 318/490 |
| 2009/0018781 | A1 | | 1/2009 | Diezel et al. |
| 2010/0204818 | A1 | | 8/2010 | Yamada et al. |
| 2012/0089336 | A1 | * | 4/2012 | Garvey .................. E21B 47/00 702/9 |
| 2012/0303674 | A1 | * | 11/2012 | Boensch ............. G06F 17/3056 707/802 |
| 2014/0181752 | A1 | | 6/2014 | Kim et al. |
| 2015/0142154 | A1 | | 5/2015 | Tiano |
| 2017/0364056 | A1 | * | 12/2017 | Ono .................. G05B 19/4065 |

FOREIGN PATENT DOCUMENTS

| | | |
|---|---|---|
| CN | 103076764 A | 5/2013 |
| CN | 103616855 A | 3/2014 |
| CN | 103793762 A | 5/2014 |
| CN | 104002195 A | 8/2014 |
| CN | 205139693 U | 4/2016 |
| TW | M288212 U | 3/2006 |
| TW | 201226101 A | 7/2012 |
| TW | 201343320 A | 11/2013 |
| TW | 201503986 A | 2/2015 |
| TW | 201523184 A | 6/2015 |

OTHER PUBLICATIONS

Yongjin Kwon, and Gary W. Fischer. "A novel approach to quantifying tool wear and tool life measurements for optimal tool management." International Journal of Machine Tools and Manufacture 43.4 (2003): 359-368.

Jihong Chen, et al. "CPS Modeling of CNC Machine Tool Work Processes Using an Instruction-Domain Based Approach." Engineering 1.2 (2015): 247-260.

P. G. Maropoulos, and B. Alamin. "Integrated tool life prediction and management for an intelligent tool selection system." Journal of materials processing technology 61.1 (1996): 225-230.

Abraham Ber, and Donald R. Falkenburg. "Tool management for EMS." CIRP Annals-Manufacturing Technology 34.1(1985): 387-390.

W. Eversheim, et al. "Tool management: the present and the future." CIRP Annals-Manufacturing Technology 40.2(1991): 631-639.

TW Office Action dated May 12, 2017 as received in Application No. 105126657.

* cited by examiner

TOOL MANAGEMENT SYSTEM AND METHOD THEREOF

CROSS-REFERENCE TO RELATED APPLICATIONS

This non-provisional application claims priority under 35 U.S.C. § 119(a) on Patent Application No(s). 105126657 filed in Taiwan, R.O.C. on Aug. 19, 2016, the entire contents of which are hereby incorporated by reference.

BACKGROUND

Technical Field

This disclosure relates to a tool management system and a method thereof, and more particularly to a tool management system and a method for real-time managing statics and dynamic information of tools on machine tools.

Related Art

A method for tool management of a machine tool directly relates to an arrangement, execution, and a result of processing. The conventional method for tool management is statics and dispersed so a tool cannot be fully used in total life. Furthermore, because the conventional method cannot real-time calculate and adjust the parameters of the tool when processing conditions or the parameters change during operation, meaningless consumptions or damages are caused and then productivity and cost control are impacted.

Therefore, developing a tool management system and a method for real-time managing statics and dynamic information of tools on machine tools seems to be very important.

SUMMARY

According to one or more embodiments of this disclosure, a tool management system includes a reader reading at least one category parameter of the tool according to a tool index code of the tool; a receiver receiving real-time process information of the tool with a preset periodicity; a storage unit storing the tool index code, the category parameter, and the real-time process information; a processor processing a weighting algorithm to obtain a result according to the category parameter and the real-time process information; and a control unit sending a control instruction according to the result.

According to one or more embodiments of this disclosure, another tool management system includes a network interface receiving a tool index code of the tool, reading at least one category parameter according to the tool index code, and receiving real-time process information with a preset periodicity; a storage unit recording the tool index code, the category parameter and the real-time process information; a processor executing a weighting algorithm to obtain a result according to the category parameter and the real-time process information; and a control unit sending a control instruction, according to the result, via the network interface.

According to one or more embodiments of this disclosure, a method for tool management of machine tools includes the steps of reading at least one category parameter of the tool according to a tool index code of the tool,; receiving real-time process information of the tool with a preset periodicity; executing a weighting algorithm to obtain a result according to the category parameter and the real-time process information; determining whether the result is matched to a condition; if the result is matched to the condition, sending a control instruction; and if the result is not matched to the condition, redoing the steps from the step of receiving the real-time process information.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

In the following embodiments, the steps can be changed, removed or moved. Besides, an extra step can be added before or after any original step.

Figure 1:
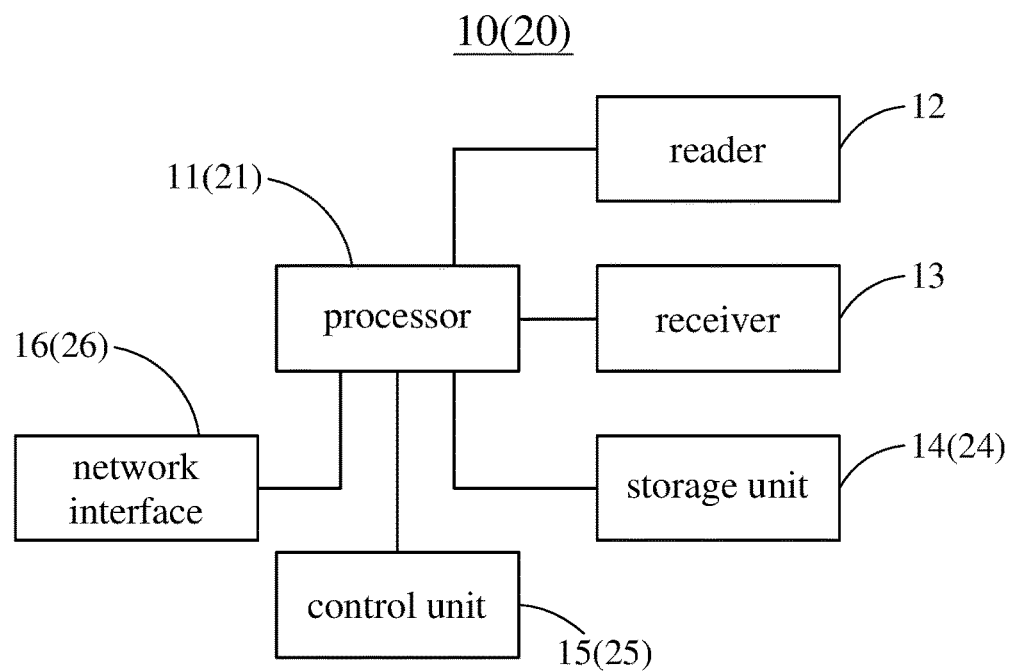
FIG. 1 is a tool management system 20 in another embodiment of this disclosure.

FIG. 1 is a system architecture diagram of a tool management system 10 in an embodiment of this disclosure. The tool management system 10, for example, includes a processor 11, a reader 12, a receiver 13, a storage unit 14 and a network interface 16. The processor 11 is, for example, a processor with functions of mathematical operation and logic judgment. The reader 12 is, for example, a device, a port or an interface, for reading various kinds of codes or data. The receiver 13 is, for example, a device, a port or an interface, for receiving various kinds of sensing signals. The storage unit 14 is, for example, a fixed media, a movable media, a fixed circuit or a movable circuit, for storing various kinds of data or information. The control unit 15 is, for example, a circuit for sending control instructions to various kinds of driver apparatus. The network interface 16 is, for example, an interface circuit for various kinds of network communication.

FIG. 1 shows a tool management system 20 in another embodiment of this disclosure. The tool management system 20, for example, includes a processor 21, a storage unit 24, a control unit 25 and a network interface 26. In this embodiment, the processor 21, the storage unit 24, the control unit 25 and the network interface 26 are selectively similar or equal to the aforementioned processor 11, the storage unit 14, the control unit 15 and the network interface 16 respectively.

Figure 2:
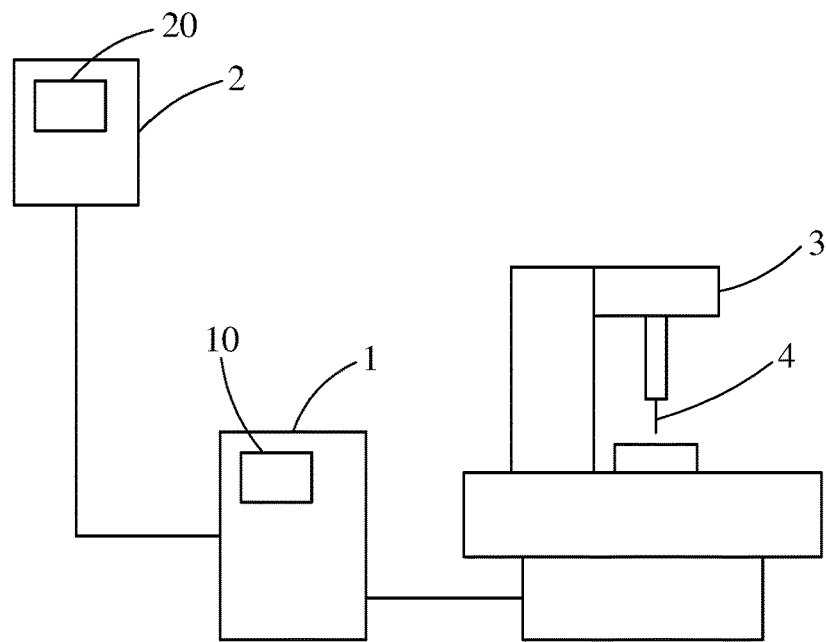
FIG. 2 is an arrangement diagram of a tool management system 10 in an embodiment of this disclosure.

FIG. 2 is an arrangement diagram of a tool management system 10 in an embodiment of this disclosure. In this embodiment, the tool management system 10 is installed on or integrated into a controller 1. Besides, existing components of the controller 1, such as a processor, a communication module, a storage module, input/output modules and monitor, can cooperate with the tool management system 10 or be applied as before. The controller 1 is connected to a machine tool 3 and controls all the operation of the machine tool 3 so the tool management system 10 has the same function of controlling the machine tool 3.

FIG. 2 also shows a tool management system 20 installed on or integrated into a remote host 2. Similarly, existing components of the remote host 2 can be implemented in coordination with the tool management system 20 or be applied as before. As the dotted line in FIG. 2, the remote host 2 can be connected to a controller 1 or a number of controllers via a network interface 16(26) in order to centralizedly implement the operations of collection, delivery, processing and management of data or information.

Figure 3:
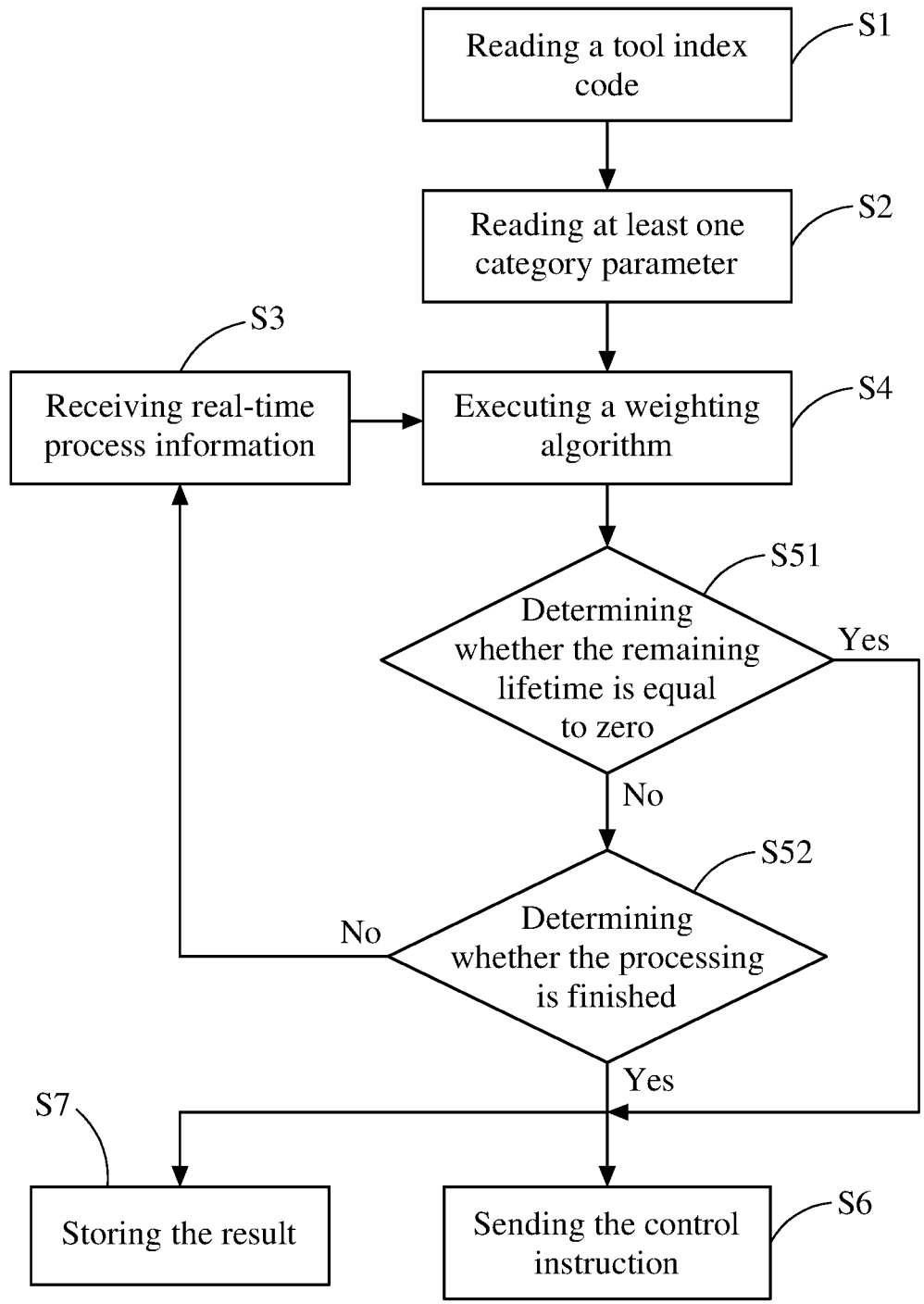
FIG. 3 is a flow chart of a method for tool management of machine tools in an embodiment of this disclosure.

FIG. 3 is a flow chart of a method for tool management of machine tools in an embodiment of this disclosure. Please refer to FIG. 2 and FIG. 3. In step S1, before a tool 4, which is disposed on the machine tool 3, is processed, the tool index code of the tool 4 is scanned and accessed by RFID mothed or optical bar-code reading Technology. In step S2, according to the unique tool index code, the reader 12 reads the related category parameter from the storage unit 14 or the storage unit 24. For example, the category parameter is the parameter of a tool type category, a tool standard category, a tool life category or a tool using base value category. The fixed or static data of the tool 4 is recorded in the above categories.

In step S3, when the category parameter is obtained and the tool 4 starts being processed, the receiver 13 receives a shaft value of every drive shaft of the machine tool 3 from controller 1 with a preset periodicity t, or receives vibration magnitude, which is detected by a sensor on every part of the machine tool 3, with the preset periodicity t, such as 100 milliseconds. In other words, the receiver 13 can receive vibration magnitude of a preset part from the sensor on the preset part. The shaft current value and the vibration magnitude belong to dynamic real-time process information and are related to processing conditions, including a cutting depth and a feeding rate, at that time. The changes in the processing conditions may impact on the remaining lifetime of the tool 4.

In step S4, in an embodiment, when the processor 11 obtains the category parameter and the real-time process information updated with the preset periodicity, the processor 11 executes a weighting algorithm. In another embodiment, when the processor 21 obtains the category parameter and the real-time process information which are sent from a network and updated with the preset periodicity, the processor 21 executes a weighting algorithm. The weighting algorithm is to obtain a remaining lifetime Tr of the tool 4, and the remaining lifetime Tr is a total lifetime T minus an accumulated using time Ta and a real-time using time Trt. For example, the weighting algorithm is the following formula 1 wherein both the total lifetime T and the accumulated using time Ta are stored in the tool life category. Besides, the real-time using time Trt is obtained from a shaft current base value Ib, vibration base magnitude Vb, a shaft current value I, vibration magnitude V, and the preset periodicity t. The shaft current base value Ib and the vibration base magnitude Vb are stored in the tool using base value category. The shaft current value I and vibration magnitude V are included in the real-time process information. For example, the real-time using time Trt is obtained from the following formula 2 wherein the shaft current base value Ib is defined as an average shaft current value under the normal processing conditions, and the vibration base magnitude Vb is defined as an average vibration magnitude of the preset part under the normal processing conditions. Both the shaft current base value Ib and the vibration base magnitude Vb are fixed values. Different base values are provided from the tool using base value category according to a tool material, a processing category, and a work piece material. For example, the tool is a drill bit which is made of high speed steel and used for drilling aluminum or iron, and the tool using base values of the drill bit are different from ones of another kind of tool.

$$Tr = T - Ta - Trt \qquad \text{Formula 1}$$

$$Trt = \sum_{i=1}^{n} t\left(\frac{Ii}{Ib}\right)\left(\frac{Vi}{Vb}\right) \qquad \text{Formula 2}$$

Wherein Ii and Vi indicate the shaft current value and the vibration magnitude during the $i^{th}$ period. t is the time of one period such as 100 milliseconds, and n is the number of periods.

In formula 2, the weighting factor is that the ratio of the shaft current value Ii and the shaft current base value Ib multiplies the ratio of the vibration magnitude Vi and the vibration base magnitude Vb. However, in practice, the weighting factor may be just the ratio of the shaft current value I and the shaft current base value Ib or the ratio of the vibration magnitude V and the vibration base magnitude Vb, and the calculated result is not influenced. According to formula 1 and formula 2, when the tool 4 is processed abnormally, the real-time using time Trt increases following the increase of the shaft current value I or the vibration magnitude V, and the remaining life time Tr decreases, which means the lifetime of the tool 4 is reduced, due to the increase of the real-time using time Trt. In contrast, when the tool 4 is idling, the ratio of the shaft current value I and the shaft current base value Ib is very low so the real-time using time Trt is almost equal to zero. As a result, the lifetime of the tool 4 remains the same.

The processor 11(21) obtains a result after executing the weighting algorithm, and the result includes at least a remaining lifetime Tr of the tool 4. In step S51, the processor 11(21) determines whether the remaining lifetime Tr is equal to zero. When the remaining lifetime Tr is equal to or almost equal to zero, even though the processing is not finished, the processor 11(21) commands the control unit 15(25) to send a control instruction, such as to stop using, to the controller 1 or to announce an operator to stop the machine tool 3 for the replacement of the tool 4 in step S6. At the same time, in step S7, the storage unit 14(24) updates the real-time using time Tr or adds it to the accumulated using time Ta which is stored in the storage unit 14(24), and the control unit 15(25) annotates that the tool lifetime is over to avoid incorrect usage. When the real-time using time Tr is determined not equal to zero, in step S52, the processor 11(21) determines whether the processing is finished or not. When the processing is finished, the control unit 15(25) also sends the control instruction to stop using and announces the operator to replace the tool 4 with a new tool or unload the tool 4 for the next processing in step S6. At the same time, in step S7, the real-time using time Tr is updated or added to the accumulated using time Ta. On the contrary, when the processing is not finished, the processor 11(21) continues receiving the real-time process information in step S3 and re-executes the weighting algorithm until the processing is finished.

When the processing is finished but the remaining lifetime Tr of the tool is not zero, the storage unit 14(24) updates the accumulated using time Ta. Therefore, no matter how various machine tools or work pieces the tool 4 is used with, the tool is fully utilized in its total lifetime T. All of statics and dynamic information of the tool in its total life can be real-time presented in the data management. The tool management system 20 of the remote host 2 is capable of centralized receiving, storing, calculating and controlling a number of tools on a number of machine tools in order to control the real-time conditions of the tools. Moreover, the purpose of statics and dynamic information management of tools on machine tools is achieved.

In view of the above description, the tool management system and the method thereof in an embodiment of this disclosure is capable of real-time and centralized arranging statics and dynamic information of a number of tools of a number of machine tools via a remote host. As a result, the tool management system and the method thereof is capable of controlling the condition of each tool, having the best beneficial result in total life of each tool, and solving the problems of the conventional tool management system and the method thereof.

What is claimed is:

1. A tool management system of machine tools, applied to at least one tool, and comprising:
    a reader configured for reading at least one category parameter of the tool according to a tool index code of the tool;
    a receiver configured for receiving real-time process information of the tool with a preset periodicity;
    a storage unit configured for storing the tool index code, the category parameter, and the real-time process information;
    a processor configured for processing a weighting algorithm to obtain a result according to the category parameter and the real-time process information; and
    a control unit configured for sending a control instruction according to the result,
    wherein the weighting algorithm is a total lifetime (T) of the tool minus an accumulated using time (Ta) and a real-time using time (Trt),
    wherein the real-time using time is defined as a summation of products, each of which is a product of the preset periodicity, a shaft current ratio and a vibration magnitude ratio, wherein the shaft current ratio is a ratio of a shaft current value to a shaft current base value, and the vibration magnitude ratio is a ratio of a vibration magnitude to a vibration base magnitude.

2. The tool management system according to claim 1, wherein the real-time process information at least comprises a shaft current value and vibration magnitude of a preset part.

3. The tool management system according to claim 1, wherein the category parameter comprises a tool life category and a tool using base value category.

4. The tool management system according to claim 1, wherein the result comprises remaining lifetime (Tr) of the tool.

5. The tool management system according to claim 1, wherein the control instruction comprises to stop using.

6. The tool management system according to claim 1, further comprising a network interface that is configured for receiving the category parameter from a remote host, and sending the real-time process information and the result to the remote host.

7. A tool management system of machine tools, applied to at least one tool, and comprising:
    a network interface configured for receiving a tool index code of the tool, reading at least one category parameter according to the tool index code, and receiving real-time process information with a preset periodicity;
    a storage unit configured for recording the tool index code, the category parameter and the real-time process information;
    a processor configured for executing a weighting algorithm to obtain a result according to the category parameter and the real-time process information; and
    a control unit configured for sending a control instruction, according to the result, via the network interface,
    wherein the weighting algorithm is a total lifetime (T) of the tool minus an accumulated using time (Ta) and a real-time using time (Trt),
    wherein the real-time using time is defined as a summation of products, each of which is a product of the preset periodicity, a shaft current ratio and a vibration magnitude ratio, wherein the shaft current ratio is a ratio of a shaft current value to a shaft current base value, and the vibration magnitude ratio is a ratio of a vibration magnitude to a vibration base magnitude.

8. The tool management system according to claim 7, wherein the real-time process information comprises a shaft current value and vibration magnitude of a preset part.

9. The tool management system according to claim 7, wherein the category parameter comprises a tool life category and a tool using base value category.

10. The tool management system according to claim 7, wherein the result comprises remaining lifetime (Tr) of the tool.

11. The tool management system according to claim 7, wherein the control instruction comprises to stop using.

12. A method for tool management of machine tools, applied to at least one tool, and the method comprising steps of:
    according to a tool index code of the tool, reading at least one category parameter of the tool;
    receiving real-time process information of the tool with a preset periodicity;
    according to the category parameter and the real-time process information, executing a weighting algorithm to obtain a result;
    determining whether the result is matched to a condition;
    if the result is matched to the condition, sending a control instruction; and
    if the result is not matched to the condition, redoing the steps from the step of receiving the real-time process information,
    wherein the weighting algorithm is a total lifetime (T) of the tool minus an accumulated using time (Ta) and a real-time using time (Trt),
    wherein the real-time using time is defined as a summation of products, each of which is a product of the preset periodicity, a shaft current ratio and a vibration magnitude ratio, wherein the shaft current ratio is a ratio of a shaft current value to a shaft current base value, and the vibration magnitude ratio is a ratio of a vibration magnitude to a vibration base magnitude.

13. The method according to claim 12, wherein the real-time process information comprises a shaft current value and vibration magnitude of a preset part.

14. The method according to claim 12, wherein the category parameter comprises a tool life category and a tool using base value category.

15. The method according to claim 12, wherein the result comprises remaining lifetime (Tr) of the tool.

16. The method according to claim 12, wherein the control instruction comprises to stop using.

* * * * *